D. KLEIN.
TEAT CUP.
APPLICATION FILED JAN. 25, 1909.
949,186.
Patented Feb. 15, 1910.
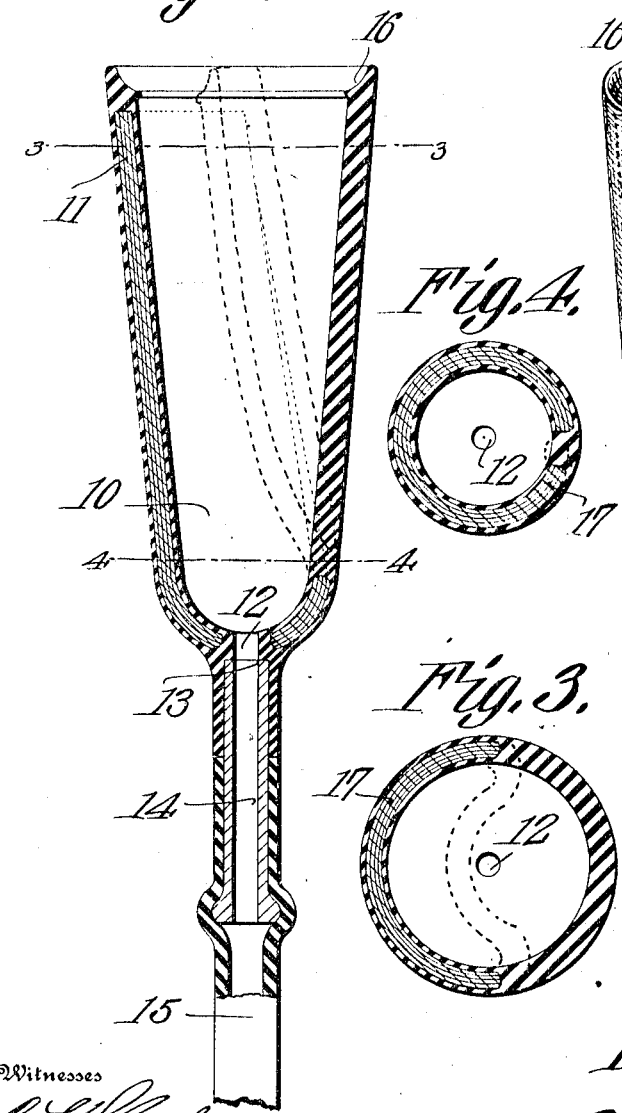
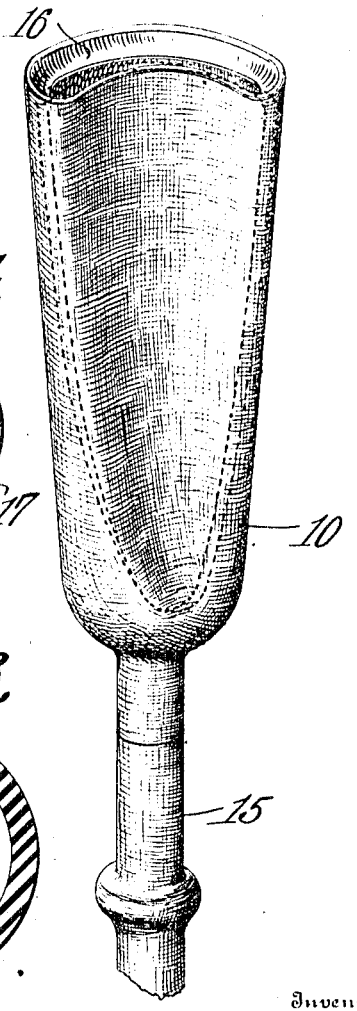
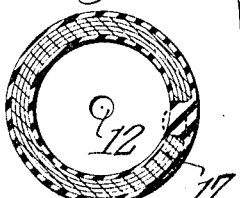
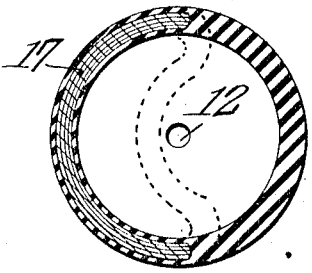
Inventor
Daniel Klein.

UNITED STATES PATENT OFFICE.

DANIEL KLEIN, OF SPOKANE, WASHINGTON.

TEAT-CUP.

949,186.  Specification of Letters Patent.  Patented Feb. 15, 1910.

Application filed January 25, 1909. Serial No. 474,117.

*To all whom it may concern:*

Be it known that I, DANIEL KLEIN, a citizen of the United States, residing at Spokane, in the county of Spokane and State of Washington, have invented a new and useful Teat-Cup, of which the following is a specification.

This invention relates to teat cups of that general class employed in connection with the cow milking apparatus and has for its principal object to provide a teat cup which in operation will closely approximate the natural action of the calf.

A further object of the invention is to provide a teat cup of such construction as to prevent congestion of the teat and to compress the latter very gradually from the root toward the tip.

A still further object of the invention is to provide a teat cup formed of relatively rigid or non-yielding material and provided with a freely flexible section which when subjected to the action of the vacuum within the cup will gradually press against the teat.

A still further object of the invention is to provide a teat cup formed for the most part of, or reinforced with, non-yieldable material and having a yieldable section of approximately triangular form the wider end of which is at the top of the cup so as to yield first when subjected to the action of the vacuum.

A still further object of the invention is to provide a teat cup formed of rubber and provided with a reinforce of some relatively stiff material.

With these and other objects in view as will more fully hereinafter appear the invention consists in certain novel details of construction and arrangement of parts, as will be more fully hereinafter described, illustrated in the accompanying drawings, and more particularly pointed out in the appended claims, it being understood that various changes in the form, proportion, size and minor details of construction may be made without departing from the spirit or sacrificing any of the advantages of the invention.

In the accompanying drawings:—Figure 1 is a sectional elevation of a teat cup constructed in accordance with the invention. Fig. 2 is a perspective view of the same. Fig. 3 is a sectional plan view of the teat cup on the line 3—3 of Fig. 1. Fig. 4 is a similar view on the line 4—4 of Fig. 1.

Similar numerals of reference are employed to indicate corresponding parts throughout the several figures of the drawings.

The teat cup 10 is gradually tapered to conform to the structure of the teat and at its lower end is provided with an integral nipple of rubber which communicates with the milk discharge opening 12 at the bottom of the cup there being an abrupt shoulder 13 formed within the nipple for the reception of the inner end of a connecting tube 14 to which the main tube 15 is coupled, this shoulder serving to prevent the nipple tube being forced within the lower portion of the cup.

The cup and nipple are formed of rubber or equivalent material and at the upper edge is an inwardly extending flange 16 that is adapted to engage against the root of the teat in much the same manner as the latter would be caught and compressed by the gums of the calf. The entire upper edge and the whole of the nipple are formed preferably of solid rubber while the main portion of the body of the cup is provided with a reinforce 17 which may be formed of canvas or other relatively stiff material. This reinforce extends at the top through approximately one-half the circumference of the cup and at the bottom extends entirely around the cup, while from a point near the bottom to the top the edge of the reinforce is inclined so as to form a tapered portion consisting simply of pure rubber and without any reinforce.

As the main body portion of the cup is relatively stiff it will not yield, or will yield only slightly when a vacuum is created within the cup by the pulsating mechanism, but the yieldable area will be forced inward by natural atmospheric pressure and the upper portion of this yieldable area being more flexible than the lower portion will close in against the teat and then as the action continues the entire yieldable area will be moved inward so that the teat will be subjected to gradual pressure from the root downward. The edges of the reinforce may be spaced from each other on other than the tapered or inclined lines shown, and may in some cases be arranged parallel with each other but the inclined form is preferred for the reason that the support given to the edges of the yieldable portion is gradually increased from the top of the cup downward so as to secure the desired gradual pressure on the teat.

Having thus described the invention, what is claimed is:—

1. A teat cup having a longitudinally disposed portion of its teat engaging wall readily yieldable and having the area of said portion of less extent toward the bottom of the cup than at the top thereof.

2. A teat cup having a longitudinally disposed teat engaging area more flexible than the remainder of the cup and gradually decreasing in flexibility from the top of the cup toward the bottom thereof.

3. A teat cup, the wall of which is provided with a stiffening reinforce, the edge of the reinforce being arranged on inclined lines spaced from each other to form an approximately triangular yieldable area.

4. A rubber teat cup having a reinforce embedded in the wall thereof, the reinforce being of less area than the wall of the cup, but of gradually greater relative circumferential extent from the teat receiving end toward the discharge end of the cup.

5. A teat cup having a teat compressing area the yieldability of which gradually decreases from the rim of the cup downward.

6. A rubber teat cup having an integral nipple, the latter having an integral abrupt shoulder for the reception of the end of a connecting tube.

In testimony that I claim the foregoing as my own, I have hereto affixed my signature in the presence of two witnesses.

DANIEL KLEIN.

Witnesses:
K. E. DAVIS,
A. C. WELD.